US 12,188,562 B2
Jan. 7, 2025

(12) United States Patent
Reukers et al.

(54) HIGH PRESSURE SEALS

(71) Applicant: QUANTUM SERVO PUMPING TECHNOLOGIES PTY LTD, Campbellfield (AU)

(72) Inventors: Darren Reukers, Campbellfield (AU); John Reyes, Campbellfield (AU); Malcolm O'Keefe, Campbellfield (AU)

(73) Assignee: QUANTUM SERVO PUMPING TECHNOLOGIES PTY LTD, Campbellfield (AU)

( * ) Notice: Subject to any disclaimer, the term of this patent is extended or adjusted under 35 U.S.C. 154(b) by 0 days.

(21) Appl. No.: 17/917,133

(22) PCT Filed: May 31, 2021

(86) PCT No.: PCT/AU2021/050531
§ 371 (c)(1),
(2) Date: Oct. 5, 2022

(87) PCT Pub. No.: WO2021/248176
PCT Pub. Date: Dec. 16, 2021

(65) Prior Publication Data
US 2023/0160474 A1 May 25, 2023

(30) Foreign Application Priority Data

Jun. 11, 2020 (AU) .................... 2020901922
Mar. 22, 2021 (AU) .................... 2021201775

(51) Int. Cl.
*F16J 15/34* (2006.01)
*F04B 39/04* (2006.01)
*F16J 15/56* (2006.01)

(52) U.S. Cl.
CPC ............. *F16J 15/34* (2013.01); *F04B 39/041* (2013.01); *F16J 15/56* (2013.01)

(58) Field of Classification Search
CPC ............ F16J 15/34; F16J 15/56; F04B 39/041
See application file for complete search history.

(56) References Cited

U.S. PATENT DOCUMENTS 4,346,903 A   8/1982   Heiermann
4,443,016 A   4/1984   Schüngel
(Continued)

FOREIGN PATENT DOCUMENTS

DE   2336118 A1   1/1975

OTHER PUBLICATIONS

International Search Report dated Jun. 21, 2021 for corresponding International Application No. PCT/AU2021/050531, filed May 31, 2021.
(Continued)

*Primary Examiner* — Gilbert Y Lee
(74) *Attorney, Agent, or Firm* — David D. Brush; Westman, Champlin & Koehler, P.A.

(57) ABSTRACT

A sealing system for sealing an annulus. The annulus is defined by a cylindrical interior and a cylindrical exterior within, and axially movable relative to, the cylindrical interior. The sealing system includes an inner seal (to surround and sealingly engage the cylindrical exterior), a seal support (to surround, and axially support, the inner seal), an outer seal (to surround the seal support and sealingly engage the seal support and the cylindrical interior), a first support ring (to sit behind an outer periphery of the outer seal), and a back stop (to surround the cylindrical exterior and axially support the seal support and the first ring).

20 Claims, 4 Drawing Sheets

(56) References Cited

U.S. PATENT DOCUMENTS

| | | | | |
|---|---|---|---|---|
| 4,570,944 A | * | 2/1986 | Traub | F16J 15/56 |
| | | | | 277/572 |
| 4,893,781 A | * | 1/1990 | Kalain | F16K 5/0694 |
| | | | | 251/315.13 |
| 4,936,197 A | * | 6/1990 | Brent | F16J 15/186 |
| | | | | 277/509 |
| 5,292,137 A | * | 3/1994 | Simmons | F16J 15/3456 |
| | | | | 277/936 |
| 6,086,070 A | | 7/2000 | Tramoulet, Jr. et al. | |
| 6,776,419 B2 | | 8/2004 | Antoun | |
| 7,247,006 B2 | | 7/2007 | Hopkins et al. | |
| 7,568,424 B2 | | 8/2009 | Hopkins et al. | |
| 2003/0122322 A1 | | 7/2003 | Tremoulet, Jr. et al. | |
| 2003/0227139 A1 | | 12/2003 | Antoun | |

OTHER PUBLICATIONS

Written Opinion of the International Searching Authority dated Jun. 21, 2021 for corresponding International Application No. PCT/AU2021/050531, filed May 31, 2021.

Australian Full Examination Report No. 1 dated May 25, 2021 for corresponding Australian Application No. 2021201775, filed Mar. 22, 2021.

Extended European Search Report dated May 7, 2024, for corresponding European Application No. 21822754.4.

* cited by examiner

HIGH PRESSURE SEALS

CROSS-REFERENCE TO RELATED APPLICATIONS

This Application is a Section 371 National Stage Application of International Application No. PCT/AU2021/050531, filed May 31, 2021, which is incorporated by reference in its entirety and published as WO 2021/248176 A1 on Dec. 16, 2021, in English.

FIELD

The invention relates to pressure systems and to components therefor.

BACKGROUND

FIG. 1 schematically illustrates a pumping system 1 for pumping fluid from an inlet 3 to an outlet 5. The system comprises a linear actuator 7 with a pump head 9 at each end.

FIG. 2 schematically illustrates an example of a pump head 9 comprising a cylinder 11 defining a pump chamber 13, a plunger 15 and one-way flow paths 17. A sealing system 19 seals the annular space between the plunger 15 and the cylinder 11 so that as the plunger 15 is stroked, by the linear actuator 7, fluid is positively displaced via the flow paths 17.

In some applications, such as water jet cutting, it is desirable to deliver ultra-high pressures such as 90 ksi. Delivering such pressures places extraordinary loads on all of the components and in particular on the sealing system 19.

U.S. Pat. No. 7,247,006 discloses various sealing systems. A portion of FIG. 3 of that patent is reproduced as FIG. 3 herein.

The sealing system of that figure comprises a seal support 21 and a bearing 23 inside the seal support. A seal 25 sits in front of and is axially supported by components 21, 23 to sealingly engage the plunger 15'. The seal support is compressed against a complementary formation at the rear of the cylinder 11' to define a tangential sealing area 27 and collapse the seal support 21 against the bearing 23.

The sealing arrangement of FIG. 3 corresponds to a commercial product with which the present inventors are familiar. Whilst that product is popular, the present inventors have recognised room for improvement. The tangential sealing interface 27 seems to reduce the life of the cylinder 11' by adding to the hoop stress therein. When the sealing assembly wears out essentially the whole sealing system, including the seal support 21 and bearing 23, must be replaced. This replacement operation is not straightforward. The force applied to the seal support 21 to compress it against the rear of the cylinder 11' must be accurately controlled to avoid damaging the bearing 23.

With the foregoing in mind, the present invention aims to provide improvements in and for sealing systems.

It is not admitted that any of the information in this patent specification is common general knowledge, or that the person skilled in the art could be reasonably expected to ascertain or understand it, regard it as relevant or combine it in any way before the priority date.

SUMMARY

One aspect of the invention provides a sealing system to seal an annulus, between an interior and an exterior axially movable within the interior, to hold fluid pressure; the sealing system comprising an inner seal to surround, and sealingly engage, the exterior;

a seal support to surround, and axially support, the inner seal; and an outer seal to surround the seal support and sealingly engage the seal support and the interior.

Preferred embodiments advantageously seal within the interior whereby, relative to the sealing arrangement of FIG. 3, the high pressure fluid is presented with a much smaller effective area over which axial forces are generated, thereby reducing the cyclical axial loading placed upon the surrounding components.

The seal support is preferably shaped to be deformed, by the fluid pressure, to tighten a fit between the seal support and the exterior to at least slow extrusion via the fit. Preferably a rear of the inner seal is set forward of a rear of the outer seal.

A peripheral support ring to sit behind and axially support a periphery of the outer seal may be provided. Preferably there is an interference fit between the peripheral support ring and the interior. The peripheral support ring may have a substantially rectangular profile but preferably has a rearwardly converging interior.

The sealing system optionally comprises an outer resilient seal ring to squeeze the outer seal. Preferably the outer seal comprises a body portion having a radial thickness. The body portion may be dimensioned to axially separate the outer resilient seal ring from the rearward-facing portion by at least the radial thickness. Preferably it is dimensioned to axially separate the outer resilient seal ring from the peripheral support ring by at least the radial thickness.

The outer resilient seal ring may be a polyurethane seal ring. There may be a back stop for the seal support, or the seal support and the support ring, to axially bear against. The seal support and back stop are configured for the seal support to have radial freedom with respect to the back stop. The seal support may have an exterior portion forwardly converging from the rearward-facing face for bearing against a back stop, although the exterior of the seal support is preferably substantially cylindrical. Preferably the back stop is configured to be clamped against a rearward-facing portion of a body defining the space. The back stop may be predominantly steel.

Optionally an inside support ring sits behind and axially supports an inside of the outer seal. The inside support ring may have a rearwardly diverging exterior.

The sealing system may comprise an inner resilient seal ring to squeeze the inner seal. The inner seal is preferably at least predominantly thermoplastic. Preferably the seal support predominantly consists of copper-based material and/or of an integral body of material. The outer seal is preferably at least predominantly thermoplastic.

Another aspect of the invention provides a pressure system comprising the sealing system;

an outer body defining the space; and an inner body defining the exterior.

The pressure system may be a pump.

The pressure system may be capable of delivering at least 50 ksi, or more preferably at least 87 ksi.

Also disclosed is a seal support for a sealing system;

the sealing system being configured to sealingly engage a cylindrical exterior and comprising an inner seal to surround the cylindrical exterior;

the cylindrical exterior being axially movable relative to a space;

the sealingly engaging being to hold fluid pressure within the space;

the seal support comprising
a backing ring portion to axially support the inner seal; and
a seal-surrounding portion to surround the inner seal;

the seal support being shaped to be deformed, by the fluid pressure, to tighten a fit between the seal support and the cylindrical exterior to at least slow extrusion via the fit.

The seal support preferably comprises a rearward-facing face for bearing against a back stop. A front of an innermost portion for engaging the cylindrical exterior may be in the range of 1.25%±1.25%, e.g. in the range of 1.25%±0.5%, of the diameter of the cylindrical exterior in front of the rearwardly directed annular face.

Preferred variants substantially comprise, rearward of the rearward-facing face, an outer diameter in the range of the 135%±10% of the diameter of the cylindrical exterior.

A seal support face may be at the front of the innermost portion to bear against the inner seal. Preferably there is a curved transition from the seal support face to the seal-surrounding concavity. Most preferably the seal-surrounding concavity substantially has a diameter in the range of 114%±5% of the diameter of the cylindrical exterior.

The seal support may comprise, in front of the seal-surrounding concavity, an inwardly-open annular groove to receive a resilient ring for squeezing the inner seal. Preferably an interior of the seal-surrounding portion comprises, forward of the inwardly-open annular groove, one or more outwardly-set portions radially outward with respect to the seal-surrounding concavity to define a passage, external to an inner seal exterior portion extending from conformal contact within the seal-surrounding concavity, for energising the resilient ring.

Preferably an exterior portion forwardly converges from the rearward-facing face.

The seal support may predominantly consist of copper-based material, e.g. bronze or more preferably an alloy thereof such as an aluminium bronze alloy or a bronze-nickel alloy. Preferably the seal support is an integral body of material.

Also disclosed is a sealing system comprising the seal support and the inner seal.

Preferably the inner seal has
an interior;
an exterior separated from the interior by a wall-thick thickness; and
a length at least three times the wall thickness.

The inner seal may be at least predominantly thermoplastic; e.g. at least predominantly UHMWPE.

The sealing system may comprise an inner resilient seal ring to sealingly engage the inner seal and the seal support and squeeze the inner seal. Preferably, the inner resilient seal ring is a polyurethane seal ring.

The sealing system preferably comprises an outer seal to surround the seal support and sealingly engage the seal support and a cylindrical interior of the space. The outer seal may be at least predominantly thermoplastic; e.g. at least predominantly UHMWPE. Preferably there is an interference fit between the outer seal and the cylindrical interior. The sealing system preferably comprises an outer resilient seal ring to squeeze the outer seal. The outer seal may comprise an outwardly-open annular groove to carry the outer resilient seal ring. Preferably, the outer resilient seal ring is a polyurethane seal ring.

The outer seal preferably comprises a periphery and, about the periphery, a rearward-facing portion by which the outer seal is axially supportable. Optionally the outer seal comprises a body portion having a radial thickness and being dimensioned to axially separate the outer resilient seal ring from the rearward-facing portion by at least the radial thickness.

The sealing system may comprise a support ring to sit behind and axially support an or the periphery of the outer seal. Preferably the support ring has a substantially rectangular profile. Preferably there is an interference fit between the support ring and the cylindrical interior. Preferably the support ring is axially supported by an or the back stop. The support ring may be formed of metal such as one of stainless steel, aluminium and aluminium bronze.

The support ring and seal support are configured to together define a rearwardly-narrowing annular space, in which case the outer seal is preferably shaped to fill the rearwardly-narrowing annular space.

The sealing system may comprise an or the back stop to axially support the seal support. The seal support and back stop may be configured for the seal support to have radial freedom, with respect to the back stop, to self-align with respect to the cylindrical exterior. The back stop may carry a bearing for aligning the cylindrical exterior. Preferably the back stop is configured to be clamped against a rearward-facing portion of a body defining the space. The back stop may be predominantly (e.g. entirely) steel.

Also disclosed is a sealing system for sealing an annulus; the annulus being defined by a cylindrical interior and a body within the cylindrical interior;

the sealing system comprising
an outer seal to surround the body and sealingly engage the body and the cylindrical interior;
a support ring to sit behind and axially support a periphery of the outer seal.

Preferably, there is an inner resilient seal ring to sealingly engage the inner seal and the seal support and inwardly urge the inner seal. The seal support may comprise an inwardly-open annular groove to carry the inner resilient seal ring.

The first ring and seal support may be configured to together define a rearwardly-narrowing annular space. The outer seal may be shaped to fill the rearwardly-narrowing annular space. The seal support may comprise a rearwardly-divergent portion to define an interior of the rearwardly-narrowing annular space.

DESCRIPTION OF EMBODIMENTS

Figure 1:
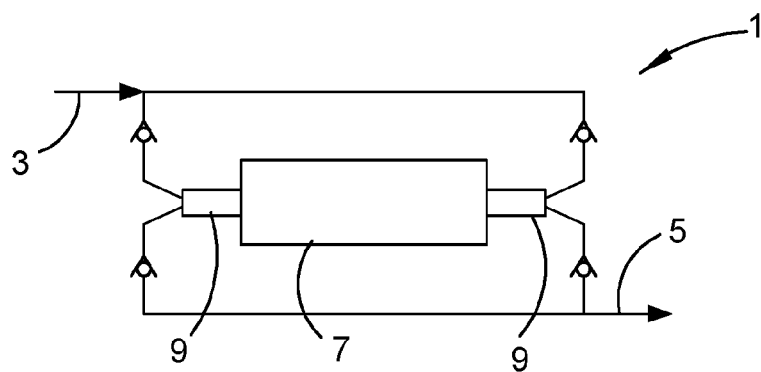
FIG. 1 schematically illustrates a pumping system.
Figure 2:
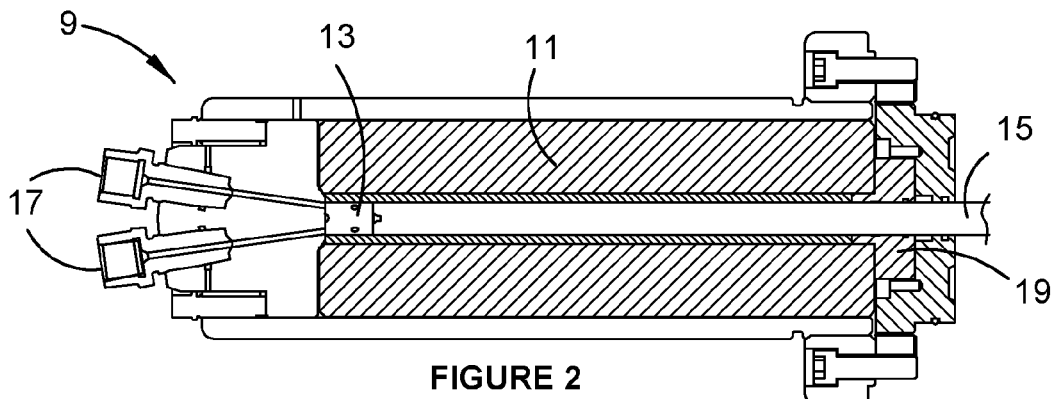
FIG. 2 schematically illustrates a pumping head.
Figure 3:
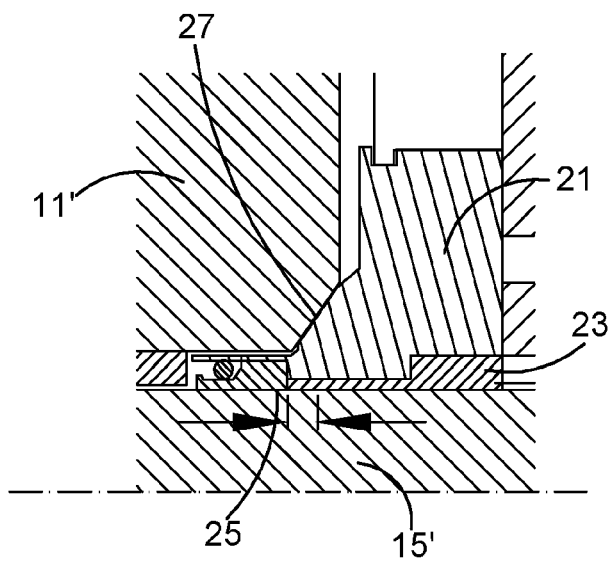
FIG. 3 is a half-section view of a sealing system.
Figure 4:
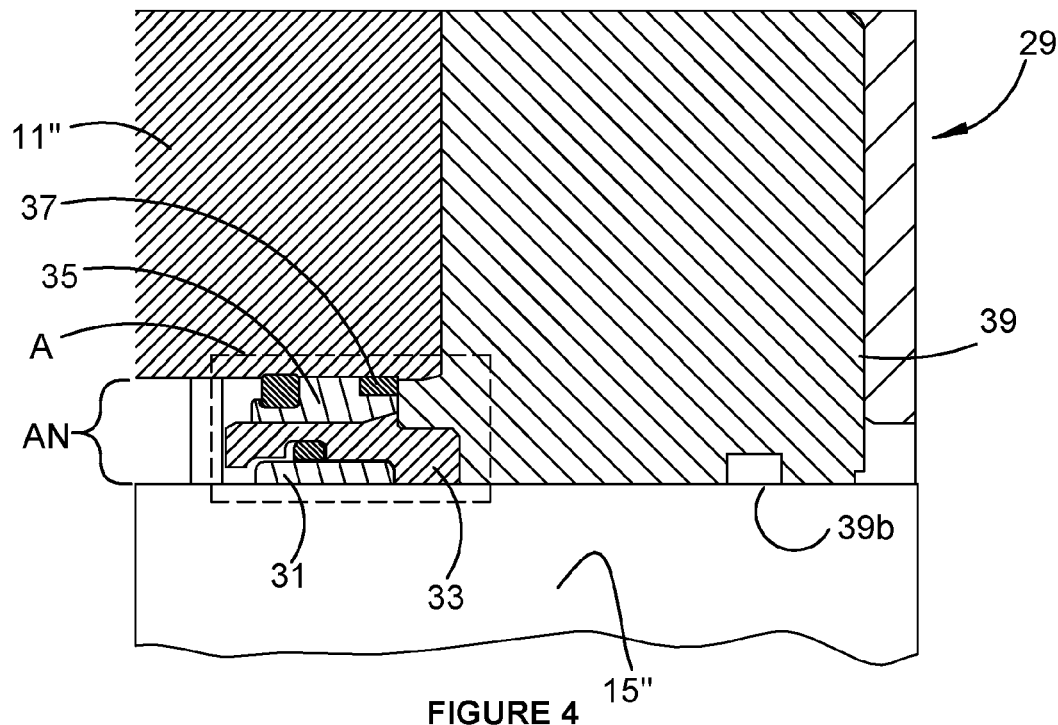
FIG. 4 is a half-section view of a sealing system.

Sealing system 29 serves to seal an annulus AN defined between a cylinder 11" and a plunger 15". In this case the plunger is cylindrical although other shapes are possible. The sealing system comprises an inner seal 31, a seal support 33, an outer seal 35, a peripheral support ring 37, a back stop 39, an inner resilient seal ring 41 and an outer resilient seal ring 43.

The inner seal 31 takes the form of a short sleeve about six times longer than its radial thickness. The outer corners are rounded. The seal is a single integral body formed of suitably compliant material. Ultra-high molecular weight polyethylene (UHMWPE) is preferred, although other polymers may be suitable.

As the wording is used herein, "integral" refers to a single continuous body of material; two bodies may be integrated by welding but not by conventional mechanical fastening.

The seal support 33 surrounds and supports the inner seal 31. Preferably, the seal support 33 is an integral body. The seal support 33 may be formed of a bronze-based material or other suitable bearing material to ride along the plunger 15". The plunger is preferably formed of zirconia. Most preferably the plunger is highly polished or otherwise has a similar degree of smoothness.

An interior of the seal support 33 presents a forward-facing surface 33a to the rear of the inner seal 31 to axially support the inner seal 31. Preferably there is a corner (as opposed to a radius) at the juncture of features 33a, 33g. In this example, the forward-facing support face 33a is substantially radial to define a substantially perpendicular circular corner 33f, 33g. The cylindrical interior 33g is the innermost portion and is dimensioned to ride along the plunger 15'.

A curved transition, in this case, a radiused transition 33h connects the support face 33a to a seal-surrounding concavity 33i. Preferably, the curved transition substantially has a radius in the range of 3.8%±2%, or more preferably 3.8%±1% of the plunger diameter. In this example the concavity 33i is substantially cylindrical. Preferably the concavity is concentric to the cylindrical interior 33g.

An inwardly-open annular groove 33j sits in front of the concavity 33i to accommodate resilient ring 41. A further cylindrical seal-surrounding concavity 33k sits in front of the groove 33j and is set radially outwards with respect to the concavity 33i. In this way, whilst the cylindrical exterior portion of the seal 31 sits in conformal contact with the concavity 33i, an annular clearance is defined between that exterior and the seal-surrounding concavity 33k, via which clearance the ring 41 is exposed to the high pressure fluid. This exposure tends to axially compress the ring 41 and thereby urge the ring 41 to increase in radial thickness. In this way, the ring 41 is energised by the high pressure fluid to radially act between the seal support 33 and the inner seal 31 to squeeze the seal 33.

Of course there are other ways by which the resilient ring carrying space might be vented to the high pressure side of the sealing system. By way of example, a circular array of axially extending laser drilled holes might be formed. Preferably plural, e.g. two, inwardly-open cut-outs 331 are equispaced about the seal support 33.

The seal support 33 further comprises an inwardly-directed lip 33m to sit in front and axially retain the inner seal 31 during assembly. The inner seal receiving space, in this case axially limited by portions 33a, 33m, is longer than the inner seal 31 to give the inner seal 31 room to axially grow under radial pressure. For similar reasons, the groove 33j is preferably longer than the ring 41 is wide.

The seal support 33 presents a cylindrical exterior portion 33b to the outer seal 35. Behind this cylindrical portion is a rearwardly-diverging conical portion 33c that sits behind the outer seal 35, to support an inside of the outer seal 35, and in register with the peripheral support ring 37.

The back stop 39 is formed of stainless steel and comprises an annular flange 39a axially projecting into the cylinder 11" and surrounding a rear 33d of the seal support 33. The back stop 39, and in this example the annular flange 39a, presents a forward-facing support surface 39b. In this case, the support surface 39b is substantially radial. The support surface 39b abuts a rear of the peripheral support ring 37 and a rearward annular face 33e of the seal support immediately behind the conical portion 33c.

In this example, the rearward annular face 33e is a single radial face. Some variants of the sealing system are configured for the face 33e and a rearmost face of the seal support 33 to both draw axial support from the back stop 30. This may be achieved by carefully controlling the axial tolerances on both parts so that upon assembly the face 33e abuts the back stop 39a and there is potentially a gap of upto a few microns at the rearmost interface, which gap is quickly closed when the sealing assembly 29 is exposed to high pressure. In this example, the rear of the backing ring portion presents a surface area to the back stop 39 much greater than the corresponding surface area presented by the portion 33e whereby, after the axial gap has been closed, the seal carrier 33 is supported mostly by this rearward face. The firm axial loading at the face 33e, and the acute corner at its outer periphery, limit the extrusion of the outer seal 35 through the interface of portions 33e, 39a.

The outer seal 35 is another integral body of material. Preferably, the outer seal 35 is formed of UHMWPE, although the other materials contemplated in respect of the inner seal 31 may also be suitable. Conveniently, the inner seal 31 and the outer seal 35 may be formed of the same material.

A rear of the outer seal 35 defines a rearwardly-tapering annular flange shaped to occupy the rearwardly-narrowing space internally bounded by the surface 33c and externally bounded by the support ring 37. In this example, the outer seal 35 also bears against and is axially supported by the back stop 39.

The peripheral support ring 37 is an integral body pressed into the cylinder 11". An outward rear corner of the outer seal 35 is shaped to conformally fit the front and interior of the support ring 37. In this case, the support ring 37 has a rectangular profile and in turn the corresponding corner of the outer seal has a stepped profile. Preferably, the profile of the peripheral support ring 37 is about twice as axially long as it is radially thick.

The outer seal 35 is preferably pressed into the cylinder 11' to form an interference fit therewith. Most preferably, the outer seal 35 is dimensioned for a radial interference in the range of 0.3%±0.2% of the plunger diameter. Optionally, the outer seal is dimensioned for a radial interference of 0.3%±0.2% of the plunger diameter with the seal support 33. These interferences help to maintain sealing contact with the cylindrical interior of the cylinder 11" as that cylinder expands under pressure. The resilient seal ring 43 encircles the outer seal 35 and inwardly urges the outer seal 35 to sealingly engage the exterior of the seal support 33. In this example, the outer seal ring 43 is a square-profiled polyurethane ring.

This variant of the outer seal 35 comprises an outwardly-open annular groove 35b to accommodate the ring 43. The full radial thickness of the ring 43 is supported from behind by the outer seal 35 whilst a short radial lip 35c defines a forward extent of the groove 35b and serves to retain the seal 43 during assembly, etc. The ring 43 is also exposed to and energised by the high pressure fluid.

Preferably, the support ring 37 is pressed into the cylinder 11" so as to achieve an interference fit that compresses the support ring 37. Preferably, the degree of compression is selected to be commensurate with the expansion of the cylinder 11" when the system is pressurised. In this way, the hoop stress in the support ring 37 is limited and in operation the ring 37 does not materially contribute to hoop stress within the cylinder 11".

The pressing operation can be relatively straightforward. The ring 37 and outer seal 35 may be pressed in by a required axial amount without careful attention to the pressing force. Of course, there are other ways of achieving an interference fit, e.g. the cylinder 11" might be heated and/or the support ring 37 might be cooled. One or both of these thermal operations might be sufficient to enable the support ring 37 to be simply placed. Alternatively, one or both of the thermal operations might be employed in combination with pressing.

The back stop 39 is preferably another integral body of material. In this case, it is formed of stainless steel. The back stop 39 encircles the plunger 15" and has an inner bore dimensioned to clear the plunger. The inner bore carries an inwardly-open annular groove 39b in which a resilient seal (e.g. O-ring) is mountable to bear against the plunger 15". This seal principally serves to stop oil moving forward but also provides a small degree of back up if some fluid leaks rearwardly from the sealing system 29.

The flange 39a embraces the rear 33d of the seal support. The portions 39a, 33d are dimensioned for a radial clearance, in this case a nominal radial clearance of 0.1 mm, whereby the seal support 33 has radial freedom with respect to the back stop 39. In this way, the seal support 33 is radially constrained by the relatively compliant outer seal 35 so that whilst the water pressure causes the seal support 33 to bear down on the plunger, that downward bearing is evenly distributed. In this case, the seal support 33 serves as a bearing by which the plunger 15" is radially restrained. In other implementations of the concept, the plunger 15" might be radially restrained by other means, in which case the radial freedom of the seal support 33 would help to accommodate a few microns of misalignment.

According to preferred variants of the sealing system, the task of sealing across the annulus AN is essentially divided by the seal support 33 into two sub-tasks. Components 31, 41 seal between components 15", 33 whilst components 35, 43 seal between components 33, 11".

The present inventors have recognised that in the context of ultra-high pressure (50,000 psi or more) polymer seals 31, 35 distribute pressure in a manner analogous to a highly viscous liquid and deform over time. In particular, the polymer seals have a tendency to extrude through any discontinuity in the axial supports backing them up.

The present inventors have christened the nominal radial gap between the exterior of the plunger 15" and the cylindrical interior 33g the 'extrusion gap'. In the context of a 16 mm diameter plunger, a nominal radial clearance of 15 μm (about 0.1%) is preferred. 15 μm is about ¼ of the thickness of a typical human hair and no surface is perfectly cylindrical. As such, when the seal support 33 is placed over the plunger 15", there is no readily observable gap. Rather, there is a sliding fit by which the low friction material of the seal support can slide over the polished exterior of the plunger 15".

This fit corresponds to an extrusion gap through which the seal 31 might be easily forced if not for the support 33 being shaped to be deformed by the fluid pressure to tighten the fit.

In this particular example, the (in profile) square solid body of material at the rear of the seal support constitutes a backing ring portion whilst portions forward of the face 33a constitute a seal-surrounding portion.

Part of the seal-surrounding portion is directly exposed to the high pressure fluid whilst other parts are exposed to that pressure via the fluid-like behavior of the seals 31, 35. Fluid pressure outwardly drives the seal support 33 along its interior forward of the seal support surface 33a. This outward driving is counteracted by inward driving along the exterior of the seal support forward of the face 33a.

The axial spacing of the surfaces 33a, 33e, or more to the point the spacing of the corresponding sealing interfaces, impacts on the magnitude of the inward and outward forces. Relatively moving the surface 33e rearwards increases the net inwards force. It is also to be born in mind that since the illustrated profile is a revolved profile rather than a parallel piped profile, per unit length the relevant circumferential area over which the radical forces act are larger on the exterior than they are on the corresponding interior of the seal support. This difference also contributes to a net inward force. Applying these principles, the shape of the seal support 33 can be selected so that the seal support is deformed, by fluid pressure, to tighten a fit between the seal support and the plunger exterior to at least slow extrusion via the fit. Preferably the inward deformation is driven predominantly, or more preferably substantially only, by fluid pressure.

Preferred variants substantially eliminate the nominal 15 μm gap to maintain a substantially conformal fit and thereby limit the extrusion of the seal 31 via the interface of components 15", 33g. Essentially, the seal support 33 is configured to be pressed against the plunger 15" by the fluid pressure whereby, over time, as the components 15", 33 wear, the fit can relax for a period of time whilst maintaining extrusion limiting conformal contact. By carefully controlling the geometry, the extent of pressing can be controlled so as to balance seal-retention and seal-service-life on the one hand vs generating heat (that would increase the tendency of the seal 31 to flow) and wear on the plunger 15" on the other hand.

In this particular implementation, the seal support face 33a is about 0.2 mm in front of the rearward face 33e. That 0.2 mm corresponds to about 1.25% of the 16 mm plunger diameter. The diameter of concavity of 33i is preferably in the range of 114%±5%, more preferably 114%±2.5%, of the plunger diameter. The outer diameter of the seal support 33 (i.e. the external diameter of the cylindrical portion forward of the ramp 33c) is not as critical. As this diameter grows, the wall thickness of the seal support and the surface area differential between the inside and the outside of the seal support both grow and to some extent these factors cancel each other out. Preferably this OD is in the range of 136%±10%, or more preferably 136%±5%, of the plunger diameter.

The backing ring portion may be upwards of 10% of the plunger diameter long. Preferably it is in the range of 20%±10%, or more preferably in the range of 20%±5%, long. The seal-surrounding portion is preferably at least 30% of the plunger diameter long, more preferably it is in the range of 55%±10% of the plunger diameter long.

In this particular implementation, the seal support 33 has an elastic modulus in the vicinity of 144 kN/mm$^2$. Whilst other materials might be adopted, preferably the seal support has an elastic modulus in the vicinity of 144 kN/mm$^2$±25 kN/mm$^2$. Other materials might be used, e.g. a stiffer material might be used by increasing the 0.2 mm dimension.

Whilst the innermost portion 33g of the seal support 33 is preferably cylindrical, other profiles might be adopted. By way of example, tests with rearwardly-diverging, slightly conical interiors showed potential for sealing against very high pressures, but wore faster than cylindrical interiors.

The controlled inward deformation in conjunction with the press fitted support ring 37 combine to form an advantageous sealing system with the advantages noted throughout, although each of these two things might be separately employed without the other. By way of example, the controlled deformation of the inner components of the system 29 might be employed in combination with an external sealing system akin to the tangential sealing interface 27. Likewise, variants of the outer seal and support ring might be usefully employed about an inner body that is not shaped for controlled inward deformation.

The sealing system 29 and variants thereof may be employed in a variety of contexts. Advantageously, they may be employed in pumping systems, such as pumping systems akin to the system 1. Other variants might be usefully employed in other contexts, such as in the context of a hydraulic intensifier or a hydraulic ram—e.g., instead of the plunger 15" being driven by a linear actuator to create pressure in the cylinder 11", the cylinder 11" might be pressurised to drive the plunger 15".

Preferred variants of the sealing arrangement 29 are capable of sealing against 90 ksi, have a reasonable service life, and are relatively inexpensive to service. In particular, typically the back stop 39 can be left in place and reused, whilst the relatively inexpensive components 31, 33, 35, 37, 41, 43 are periodically replaced. Advantageously, one variant of the sealing system takes the form of a service kit comprising consumable components 31, 33, 35, 37, 41, 43.

A preferred service operation entails removing the cylinder body 11" whilst the back stop 39 and plunger 15" are left in place. The sealing system 31, 33, 35, 37, 41, 43 can then be assembled by hand and fitted over the end of the plunger and slid backwards by hand until sitting loosely in abutment with the back stop 39. The cylinder 11 can then be replaced. For this purpose, the rear opening of the cylinder 11" preferably has a lead-in 11a", e.g. a 1 mm×20° lead-in. As the cylinder 11" is reversed by hand, the lead-in 11a" serves to guide it over the sealing system 29 as the forward portions of the system 29 are guided relatively into the interior of the cylinder. The cylinder 11 can then simply be pushed on by hand, or may require a gentle tap with a soft mallet. In this way, the annular flange 39a presses the ring 37 into the cylinder 11". This is a much simpler operation than utilising hydraulic rams to create an accurate axial pre-load across the sealing interface 27.

A preferred form of the sealing system 29 comprises an UHMWPE inner seal 31, a bronze-nickel seal support 33 and a steel back stop 39. UHMWPE has a very low coefficient of friction, low moisture absorption, and is resistant to tearing. Other suitably compliant materials might be used, although preferably the inner seal is formed of lower friction material than the material of the seal support 31.

Bronze-nickel is also wear resistant and lower friction than many other materials. The back stop may be formed of material that is higher friction than the material of the seal support since it preferably does not contact the plunger. Resilient rings 41, 43 have a hardness in the vicinity of 90 Shore A Duro. Preferably, the ring 41 is formed of suitable resilient material having a lower Young's modulus than the material of the inner seal 31. The plunger 15" is formed of zirconia, partly because it is very hard and stiff. Whilst other materials might be used, preferably the plunger 15" is formed of material harder and/or stiffer than the material of the seal support 33. Corrosion-resistant materials are preferred throughout.

Figure 5:
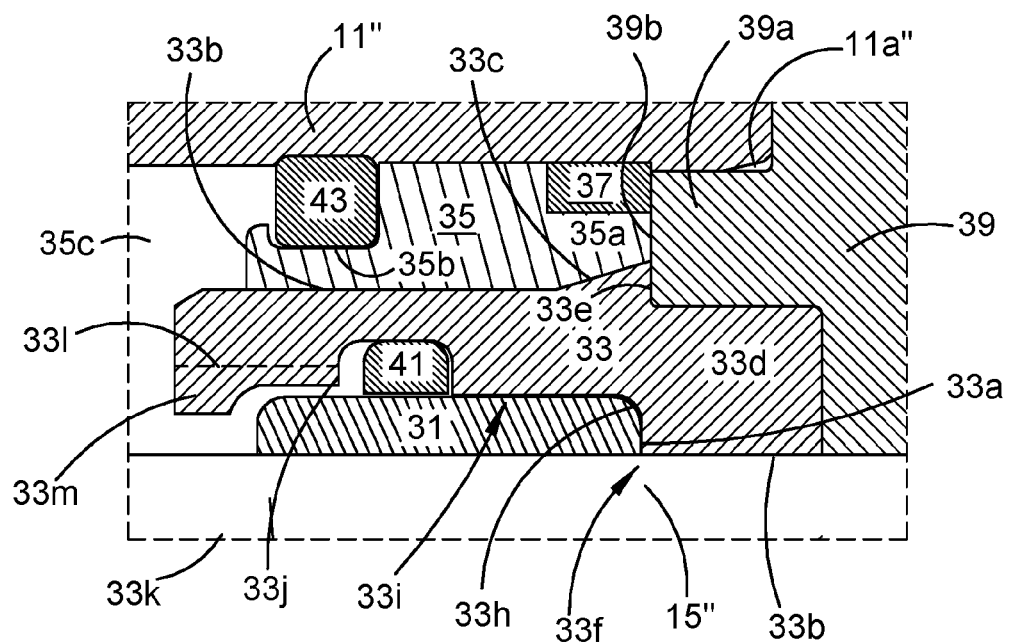
FIG. 5 is an enlargement of detail A in FIG. 4.
Figure 6:
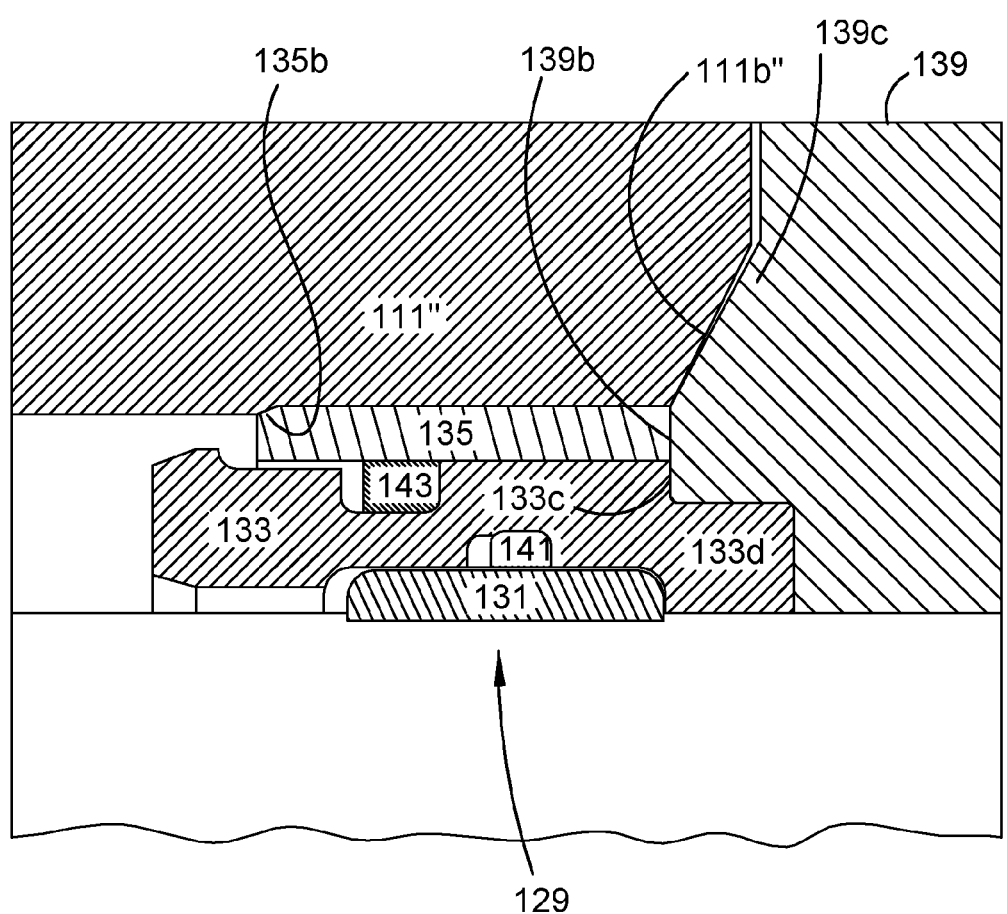
FIG. 6 is a half-section of another sealing system.

FIG. 6 illustrates a sealing system 129 comprising an inner seal 131, a rear 133d, a face 133e, an inner resilient ring 141, and portions in proximity to those components as described in respect of the inner seal 31, rear 33d, face 33e and resilient ring 41 and features in proximity to those components. In place of FIG. 5's conical surface 33c, profiled outer seal 35 and anti-extrusion ring 37, the sealing system of FIG. 6 comprises an outer seal 135 energised by a resilient ring 143. The system 135, 143 is akin to an inversion of the system 131, 141. The ring 143 is carried within an outwardly-open annular groove of the seal support 133 and radially compresses the outer seal 135 against the interior of the cylinder 111". This annular groove is vented to the high pressure side to energise the ring 143.

The outer seal 135 is essentially a tubular sleeve. In this example, a forward outer corner of the sleeve is equipped with a lead-in 135b, which in this example is a chamfer. The lead-in assists with assembly.

The outer seal 135 is backed up by the forward annular face 139b of the backstop 139. The cylinder 111" and the back stop 139 have complementary conical faces 111b", 139c" to form a seal to impede extrusion of the outer seal 135.

In this case, the rearwardly-divergent surfaces 111b", 139c are conical. Other shapes are possible. The surface 111b rearwardly diverges at a slightly larger angle of divergence and has a slightly larger inner dimension (inner diameter in this case) than the surface 139c. This leads to a conical contact patch between the surfaces 111b", 139c, the interior of which is defined by the interior of the cylinder 111b and the outer bounds of which depend on the axial compression and the resilience of the materials.

Eliminating the ring 37 simplifies the construction. Moving the resilient ring 143 to the inside of the outer seal extends the life of the ring. The inventors have recognised that, as the pumping chamber is periodically pressurised, the cylinder 111" periodically expands, which expansion wears the components in contact therewith. The seal 135 is more durable and has a lower coefficient of friction than the ring 143.

Figure 7:
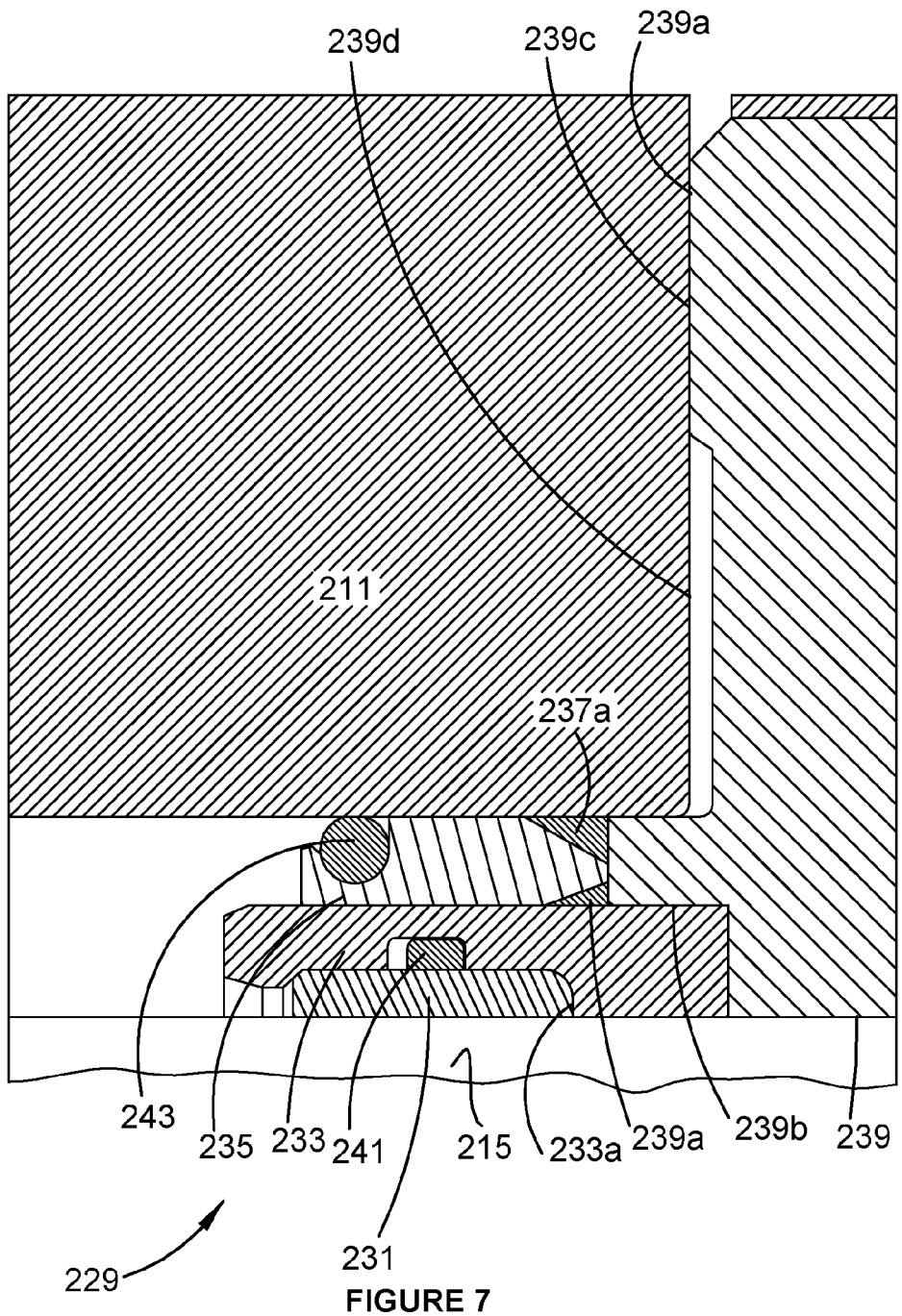
FIG. 7 is a half-section view of a sealing system.

FIG. 7 illustrates a sealing system 229. Variants of the sealing system 229 may incorporate the features and the potential variations described in connection with sealing systems 29, 129.

The sealing system 229 serves to seal between the interior of the cylinder 211 and the exterior of the plunger 215 and comprises inner seal 231, seal support 233, outer seal 235, peripheral support ring 237a and inside support ring 237b. Relative to the sealing system 29, the exterior of the seal support 233 is reprofiled. The conical portion 33c is removed and essentially replaced by the inside support ring 237b. This change avoids stress within the seal carrier associated with axial loading on the face 33e.

The exterior of the seal support 233 is substantially cylindrical and comprises a shallow lead-in at its forward end. The inside support ring 237b has a cylindrical interior to complement the exterior of the seal support 233. The components 233, 237b are carefully toleranced to provide a fit that allows for the ring 237b to have an internal diameter ranging from 70 microns smaller up to 10 microns larger than the external diameter of the seal support 223 (in the context of a 16 mm diameter plunger, similar figures may be scaled up or down to suit other sealing systems).

The inside support ring 237b is backed up by the back stop 239, or more specifically by the annular flange 239a of the back stop 239. In this case, the inside support ring 237b has a triangular profile and presents a radial rear face to a radial front of the flange 239b. The peripheral support ring 237a also has a triangular profile. The support rings 237a, 237*b* radially bracket and conformally contact a tapered-in-profile rear of the outer support ring 235.

A rear of the inner seal 231 is defined by the face 233*a* positioned 1 mm in front of the face 239*b*. In this way the system 229 is configured for the seal carrier 233 to be radially compressed by the fluid pressure to increase (e.g. create) pressure at the interface between components 215, 233. Generally speaking, increasing the 1 mm dimension increases the corresponding pressure on the interface. Preferably this dimension is in the range of 0.2 mm to 2 mm. The 0.2, 1 and 2 mm dimensions are advantageous in the context of a 16 mm diameter plunger but may be scaled up or down to suit sealing about other cylindrical exteriors. The ideal value for this key dimension will depend on a range of factors including the preferred interface pressure, the pressure against which the sealing system is sealing, and the radial thickness of the seal-surrounding portion. Generally speaking, for a given preferred interface pressure, the ideal dimension will vary in negative relation to the operating pressure.

The cylinder 211 has a planar radial rear 211*a* presented rearwardly towards the back stop 239. This face is an abutment for providing force in reaction to a preload by which the components 211, 239 are pressed towards each other.

The flange 239*a* is dimensioned to fit inside the cylinder 211 with not more than a small degree of interference, e.g. without contact. Preferably the flange 239A and the cylinder 211 present complementary cylindrical faces to each other.

The back stop 239 comprises a radial annular abutment face 239*c* outwards of annular setback 239*d*. In this way, the components 211, 239 are co-operatively configured to abut each other at locations at least twice, preferably at least three times, a radius of the interior of the cylinder 211 from a centre line of the sealing system. Moving these abutments portions outwards helps to take stress away from the stressed inboard areas of the cylinder 211.

The annular setback 239D defines an annular region of clearance at the back of the cylinder 211, which annular region of clearance is internally bounded by the cylindrical interior of the cylinder 211.

The present inventors have recognised that under cyclical high pressure loading the various components expand and contract at differing rates. By leaving the complementary cylindrical faces as the only points of potential contact between the components 211, 239 radially inwards from the abutment face 239C, the potential for the faces of these two components to slide over each other as a result of the cyclical expansion and contraction is reduced so as to avoid the potential surface damage associated therewith and thereby extend the life of the components. There are other ways in which this annular region of clearance might be created, e.g. whilst the abutment face 239C takes the form of a proud feature on the front of the back stop 239, in another variant the cylinder 211 might have a proud feature about its outer periphery.

In this example, the portions 211*a*, 239*c* are planar radial faces to transmit the axial preload without generating radial forces unlike the force at the interface 27 that comprises a radial component outwardly urging the cylinder 11'.

In this example, the face 239*c* is a circular face save for a single radial break. The radial break is but one potential example of a drain provided to give fluid somewhere to go (and thereby potentially minimise damage) should the outer seal 235 fail.

The described geometry advantageously minimises sliding interactions between the components 211, 239 associated with cyclical expansion and contraction of the components in operation.

In this example, the components 211, 239 present planar radial faces sitting in direct contact with each other. Such faces are relatively easy to produce accurately although there are other options. By way of example, in principle, net zero radial force could be produced with various complementary stepped profiles etc. Potentially components 211, 239 might be separated by one or more spacers.

The invention is not limited to the various examples disclosed herein. Rather the invention is defined by the claims.

The term "comprises" and its grammatical variants has a meaning that is determined by the context in which it appears. Accordingly, the term should not be interpreted exhaustively unless the context dictates so.

The invention claimed is:

1. An apparatus comprising:
    a sealing system to seal an annulus to hold fluid pressure in front of the sealing system;
    wherein forward is toward the fluid pressure and rearward is away from the fluid pressure;
    the annulus is between:
        an interior of a radially-outer body; and
        an exterior of a radially-inner body;
    the exterior is axially movable within the interior and within the sealing system; and
    the sealing system comprises:
        a radially-inner seal which surrounds, and sealingly engages, the exterior;
        a seal support which surrounds, and axially supports from behind, the radially-inner seal;
        a radially-outer seal which surrounds the seal support and sealingly engages the seal support and the interior; and
        at least one of:
            a radially-inner support ring which sits behind and axially supports a radially-inner inside of the radially-outer seal; or
            a radially-outer peripheral support ring which sits behind and axially supports a radially-outer periphery of the radially-outer seal.

2. The apparatus of claim 1 comprising the radially-inner support ring.

3. The apparatus of claim 2 wherein the radially-inner support ring has a rearwardly diverging exterior.

4. The apparatus of claim 1 comprising the radially-outer peripheral support ring.

5. The apparatus of claim 4 comprising a direct interference fit between the radially-outer peripheral support ring and the interior.

6. The apparatus of claim 4 wherein the radially-outer peripheral support ring has a rearwardly converging interior.

7. The apparatus of claim 4 comprising a radially-outer resilient seal ring positioned to squeeze the radially-outer seal;
    wherein the radially-outer seal comprises a body portion; and
    the body portion has a radial thickness and is dimensioned to axially separate the radially-outer resilient seal ring from the radially-outer peripheral support ring by at least the radial thickness.

8. The apparatus of claim 1 comprising a radially-outer resilient seal ring positioned to radially squeeze the radially-outer seal.

9. The apparatus of claim 1 wherein a rear of the radially-inner seal is set forward of a rear of the radially-outer seal.

10. The apparatus of claim 1 comprising a radially-inner resilient seal ring positioned to radially squeeze the radially-inner seal.

11. The apparatus of claim 1 wherein the radially-inner seal is at least predominantly thermoplastic.

12. The apparatus of claim 1 wherein the seal support predominantly consists of an integral body of material.

13. The apparatus of claim 1 wherein the radially-outer seal is at least predominantly thermoplastic.

14. A sealing system to seal an annulus to hold fluid pressure in front of the sealing system;
   wherein forward is toward the fluid pressure and rearward is away from the fluid pressure;
   the annulus is between:
      an interior of a radially-outer body; and
      an exterior of a radially-inner body;
   the exterior is axially movable within the interior and within the sealing system;
   the sealing system comprises:
      a radially-inner seal to surround, and sealingly engage, the exterior;
      a seal support which surrounds, and axially supports from behind, the radially-inner seal;
      a radially-outer seal which surrounds the seal support to sealingly engage the seal support and the interior; and
      a radially-outer resilient seal ring positioned to radially squeeze the radially-outer seal.

15. An apparatus comprising:
   a sealing system to seal an annulus to hold fluid pressure in front of the sealing system;
   wherein forward is toward the fluid pressure and rearward is away from the fluid pressure;
   the annulus is between:
      an interior of a radially-outer body; and
      an exterior of a radially-inner body;
   the exterior is axially movable within the interior and within the sealing system; and
   the sealing system comprises:
      a radially-inner seal which surrounds, and sealingly engages, the exterior;
      a seal support which surrounds, and axially supports from behind, the radially-inner seal;
      a radially-outer seal which surrounds the seal support and sealingly engages the seal support and the interior;
      at least one of:
         a radially-inner inside support ring which sits behind and axially supports a radially-inner inside of the radially-outer seal; or
         a radially-outer peripheral support ring which sits behind and axially supports a radially-outer periphery of the radially-outer seal; and
      a back stop for the seal support to axially bear against.

16. The apparatus of claim 15 comprising the radially-outer body;
   wherein the radially-outer body defines one or more abutment portions facing rearwards to provide reaction force, having a net radial component of about zero, to resist an axial pre-load by which the back stop is forwardly urged.

17. The apparatus of claim 16 wherein the one or more abutment portions predominantly consist of one or more about radial faces.

18. The apparatus of claim 15 comprising:
   the radially-outer body; and
   the radially-inner body.

19. The apparatus of claim 15 being a pump.

20. The apparatus of claim 19 being capable of delivering at least 50 ksi.

* * * * *